United States Patent

Adam et al.

[11] Patent Number: 5,948,479
[45] Date of Patent: Sep. 7, 1999

[54] METHOD OF PRODUCING A COMPOSITE MATERIAL FOR SLIDE BEARINGS WITH A PLASTICS SLIDING LAYER AND A PASTE SUITABLE THEREFOR

[75] Inventors: Achim Adam, Nauheim; Horst Mann, Wiesbaden; Stefan Fuchsberger, Eltville, all of Germany

[73] Assignee: Glyco-Metall-Werke Glyco B.V. & Co.KG, Wiesbaden, Germany

[21] Appl. No.: 08/913,291

[22] PCT Filed: Feb. 23, 1996

[86] PCT No.: PCT/DE96/00344

§ 371 Date: Aug. 25, 1997

§ 102(e) Date: Aug. 25, 1997

[87] PCT Pub. No.: WO96/26793

PCT Pub. Date: Sep. 6, 1996

[30] Foreign Application Priority Data

Mar. 1, 1995 [DE] Germany ............ 195 07 045

[51] Int. Cl.⁶ .................. C08J 5/14; B05D 3/02; C08F 27/12
[52] U.S. Cl. .............. 427/388.4; 264/127; 523/149; 524/805
[58] Field of Search .................. 264/127, 113, 264/122; 524/805; 427/375, 388.4; 523/149

[56] References Cited

U.S. PATENT DOCUMENTS

| | | | |
|---|---|---|---|
| 4,153,661 | 5/1979 | Ree et al. | 264/127 |
| 4,615,854 | 10/1986 | Pratt et al. | 264/127 |
| 4,732,818 | 3/1988 | Pratt et al. | 428/547 |
| 4,740,340 | 4/1988 | Pratt et al. | 264/171 |
| 5,019,308 | 5/1991 | Pratt et al. | 264/87 |
| 5,312,576 | 5/1994 | Swei et al. | 264/127 |

FOREIGN PATENT DOCUMENTS

| | | |
|---|---|---|
| 2 563 468 | 10/1985 | France . |
| 1 132 170 | 7/1962 | Germany . |
| 1 132 710 | 7/1962 | Germany . |
| 2 563 468 | 10/1985 | Germany . |

OTHER PUBLICATIONS

Encyclopedia of Chemical Technology, 4th Ed., vol. 11, 1994, pp. 626 and 636.
Kunstoff–Handbuch Bd. XI Carl Hanser Verlag Munchen, 1971, pp. 286–290.

*Primary Examiner*—Tae Yoon
*Attorney, Agent, or Firm*—Herbert Dubno; Andrew Wilford; Jonathan Myers

[57] ABSTRACT

In accordance with the method according to the invention, for the production of the plastics overlay, first of all a paste is made of a plastics dispersion and fillers. This paste is free of organic solvents and is applied to a sintered porous metal layer. The multilayer material thus produced is then sintered. Since the use of organic solvents is dispensed with, health risks and the risk of fire are reduced. Moreover, the composite materials produced according to the invention exhibit excellent cavitation resistance. In addition to conventional lubricant-free applications, such as bearings, these composite materials may consequently be used in particular in gear pumps and shock absorbers.

14 Claims, 1 Drawing Sheet

METHOD OF PRODUCING A COMPOSITE MATERIAL FOR SLIDE BEARINGS WITH A PLASTICS SLIDING LAYER AND A PASTE SUITABLE THEREFOR

FIELD OF THE INVENTION

The present invention relates to a method of producing a composite material for plain bearings with a plastics overlay, as well as to a paste required in said production. The invention also relates to a method of using the composite material.

BACKGROUND OF THE INVENTION

Self-lubricating be a ring materials are already known. In their most common form they consist of a porous sintered layer of tin or lead-bronze alloys applied to a steel backing. Mixtures of fluoropolymers with various fillers are worked into the porous sintered layer in such a way that they form a layer of from 10 to 30 µm on the sintered backing.

A method for producing self-lubricating bearings is described in DE-PS-1 132 710. In this method a paste produced from a PTFE dispersion (polytetrafluoroethylene dispersion) and fillers is inserted under pressure into cavities in a porous bronze layer and the metal is then sintered. DE-PS-1 132 710 also describes the production of a PTFE filler paste. The fillers are mixed with a PTFE dispersion in a concentration of between 5 and 60%, whereupon, with the aid of a salt which forms an insoluble compound with the dispersion-stabilising ionic wetting agent, coagulation of the PTFE then occurs with homogeneous inclusion of the added fillers. It should be mentioned that in this method volatilizable organic solvents, e.g. toluene, and optionally additionally a surface-active substance, such as ethylphenylpolyglycol ether or a fatty alkyl sulphonate, may be used. The surface-active substances are used for the purpose of better wetting and thus more homogeneous incorporation of the fillers. The organic solvents are used in order to achieve the desired consistency of the paste, which enables the achievement of the necessary small covering layer thicknesses of from 10 to 30 µm on the finished part.

In heavily loaded plain bearings cavities often arise through cavitation, which cavities explode again after a short time, thereby releasing energy. This released energy results in local destruction of the material, whereby the service life of the components made of the material is considerably reduced.

OBJECT OF THE INVENTION

The object of the invention is to provide a method of producing composite materials for plain bearings with a plastics overlay with which defect-free plastics overlays, especially of less than 20 µm may be produced, which exhibit a longer service life and improved cavitation resistance.

SUMMARY OF THE INVENTION

This problem is solved by a method of producing a composite material for plain bearings with a plastics overlay in which a paste free of organic solvents is used.

To produce the paste, a dispersion consisting of up to 60 wt. % fluorothermoplastics with added ionic wetting agent and also water is preferably mixed with from 5 to 50 vol. % of filler, based on the volume of the fluorothermoplastics, with from 0.1 to 1.5 wt. % of a non-ionic wetting agent, based on the amount of fluorothermoplastics, and an excess of water and then precipitated with a precipitation agent, the excess water is removed, the paste is applied to a sintered, porous metal layer covering a backing metal and the multilayer material thus produced is then sintered. The proportion of ionic wetting agent in the dispersion is preferably in the range of from 1 to 5 wt. % based on the amount of fluorothermoplastics.

By using an amount of non-ionic wetting agent specifically conformed to the fluorothermoplastics dispersion used, the release of water by the paste after the precipitation process is slowed down. If the overall concentration of non-ionic wetting agent is kept within a narrow range lying between 0.1 and 1.5 wt. %, preferably 0.1 to 1.0 wt. %, based on the amount of fluorothermoplastics, the paste will reach a state, after coagulation of the fluorothermoplastics and during the stirring process, in which it may be applied to the porous metal backing without defect and in any desired thickness. An alkyl polyglycol ether is preferably used as the non-ionic wetting agent. However, the use of alkyl aryl polyglycol ether, alkylamino polyglycol ether, acyl polyglycol ether, alkylamine oxides or fatty acid esters of polyalcohols is also possible.

The use of ionic surface-active substances is unsuitable for these purposes, since these are deactivated during the precipitation process by the formation of insoluble compounds and thus can no longer influence the consistency of the paste.

The fluorothermoplastics may, for example, be PTFE (polytetrafluoroethylene), PFA (poly(tetrafluoroethylene-co-perfluorovinylmethyl ether)), PEP (poly(tetrafluoroethylene-co-hexafluoropropylene)), ETFE (poly(ethylene-alt-tetrafluoroethylene)) or a mixture of these. According to the invention, use of PTFE is preferred. The ionic wetting agent contained in the dispersion is sodium lauryl sulphate, for example. Examples of fillers are molybdenum disulphide, lead, lead oxide, graphite, coke, carbon black, bronze, plastics, fibrous materials and mixtures of these materials. The backing material may comprise steel, bronze or aluminum, to which a porous metal layer is applied which preferably consists of bronze.

A particular advantage of this method is that the use of organic solvents is dispensed with, whereby the health risks for those involved in manufacture and a high fire risk are considerably reduced. This also results in considerably lower expenditure on safety precautions in the production plant and workplaces.

Composite materials which have been coated with various PTFE/filler mixtures are investigated below, with the aid of Examples, various fillers and wetting agents being used.

EXAMPLE 1

A paste is produced by homogeneously mixing 16 l water, 50 g alkyl polyglycol ether and 5 kg molybdenum disulphide with 21.6 kg of a 40% PTFE dispersion and then effecting precipitation with 400 g of a 20% aluminum nitrate solution. After a settling time of 5 minutes the excess water is removed and the paste produced is applied to the metal strip in a layer of a thickness of 15 µm; finally, the multi-layer material is sintered and calibrated in the conventional manner. A composite material (1) according to the invention is obtained.

To clarify the effect of the invention, three further paste-based composite materials were produced.

PRIOR ART

A composite material (2) is produced as in Example 1. The paste required for production contains 20 vol. % $MoS_2$, based on the volume of PTFE, as well as toluene and the ionic wetting agent sodium lauryl sulphate. No non-ionic wetting agent is added.

EXAMPLE 3

A composite material (3) according to the invention is produced as in Example 1, the paste containing PTFE and 20 vol. % Pb, based on the volume of PTFE, and the non-ionic wetting agent alkyl polyglycol ether. No organic solvent is used.

EXAMPLE 4

A composite material (4) corresponding to the prior art is produced as in Example 3, no non-ionic wetting agent being used, but toluene and sodium lauryl sulphate being added to the paste.

BRIEF DESCRIPTION OF THE DRAWING

The above and other objects, features, and advantages will become more readily apparent from the following description, reference being made to the accompanying drawing in which:

In a comparative test, the composite materials are then tested for cavitation resistance. The test is carried out on 10 mm wide bushings with an internal diameter of 22 mm in shock absorbers under a lateral load of 2000 N and an inclined axial movement of 40 mm amplitude and 1 Hz. FIG. 1 gives the results of these investigations.

Figure 1:
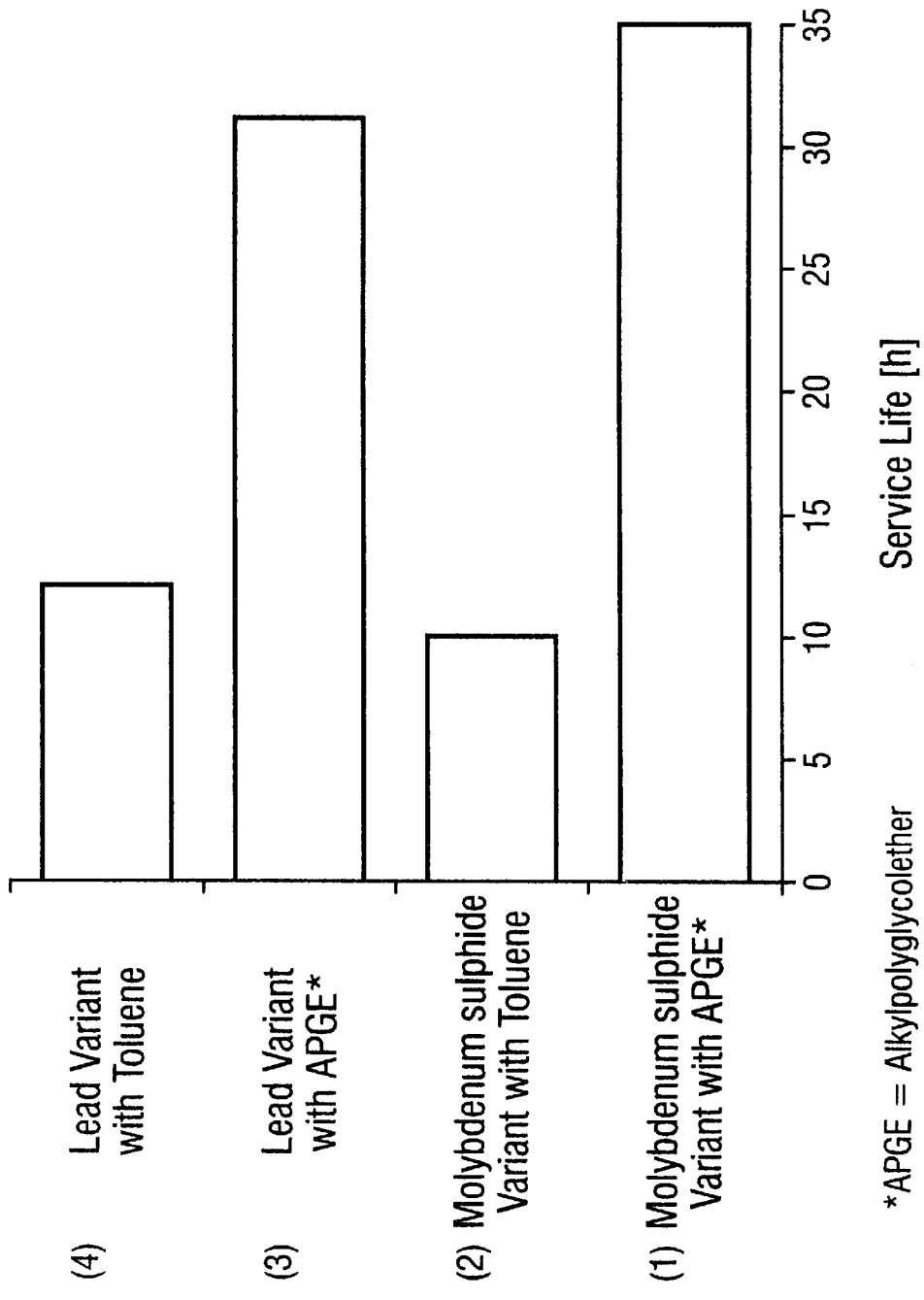
FIG. 1 is a bar graph comparing the service life of composite materials for plain bearings prepared according to the present invention with the service life of composite materials prepared according to the prior art.

It may be seen that the cavitation resistance of the composite materials according to the invention is substantially improved in comparison with conventional materials.

The results are a consequence of more complete expulsion of the moisture from the paste and thus of more effective compression of the plastics composition during the rolling-in process. During evaporation of the residual water, less porosity is engendered in the plastics layer than is the case with additional contents of organic solvents and thus a more complete sintering process is made possible by a higher proportion of PTFE particle contact surfaces. In accordance therewith, peeled surface samples are markedly tougher. Under high cavitation stress, such as occurs in shock absorbers or indeed in hydraulic pumps, the thus reinforced bond inside the layer inhibits the leaching out of surface fragments and thus increases the reliability of the components.

In addition to conventional lubricant-free applications, such as bearings, these composite materials may consequently also be used in particular in gear pumps and shock absorbers.

We claim:

1. A method for preparing a sintered mult-layered plain bearing fluorothermoplastic composite material which comprises the steps of:
   (a) producing an aqueous dispersion of organic solvents and which comprises:
     (1) an aqueous dispersion free of fluorothermoplastic;
     (2) 0.1 to 1.5% by weight of a non-ionic wetting agent, based on the amount of fluorothermoplastic;
     (3) 1 to 5% by weight of an ionic wetting agent based on the amount of fluorothermoplastic;
     (4) 5 to 50% by volume of a filler in relation to the volume of fluorothermoplastic; and
     (5) water;
   (b) precipitating the aqueous dispersion formed according to step (a) by adding thereto a precipitating agent and allowing a precipitated paste to settle;
   (c) removing only excess water from the paste precipitated according to step (b) to obtain a paste which may be applied to a sintered porous metal layer without defect in any desired thickness;
   (d) following step (c), applying the paste to a sintered porous metal layer to obtain a fluorothermoplastic overlay on said porous metal layer thereby forming a multilayered material; and
   (e) sintering the multi-layered material formed in step (d) to obtain a plain bearing fluorothermoplastic composite material where the thickness of the fluorothermoplastic overlay on the sintered, porous metal layer is less than 30 microns.

2. The method defined in claim 1 wherein according to step (a) the aqueous dispersion of a fluorothermoplastic contains up to 60% by weight of the fluorothermoplastic.

3. The method defined in claim 1 wherein according to step (a) the fluorothermoplastic is selected from the group consisting of polytetrafluoroethylene, {poly (tetrafluoroethylene-co-perfluorovinylmethyl ether)}, {poly (tetrafluoroethylene-co-hexafluoropropylene)}, {poly (ethylene-alt-tetrafluoroethylene)} and mixtures thereof.

4. The method defined in claim 1 wherein according to step (a) the non-ionic wetting agent is selected from the group consisting of an alkyl polyglycol ether, an alkyl aryl polyglycol ether, an acyl polyglycol ether, an alkylamine oxide and a fatty acid ester of a polyalcohol.

5. The method defined in claim 1 wherein according to step (a) the proportion of non-ionic wetting agent ranges between 0.1% by weight and 1.0% by weight in relation to the amount of the fluorothermoplastic.

6. The method defined in claim 1 wherein according to step (a) the filler is selected from the group consisting of molybdenum sulfide, lead, lead oxide, graphite, coke, carbon black, bronze, plastic materials, fiber materials and mixtures thereof.

7. The method defined in claim 1 wherein according to step (a) the filler is added in an amount of 15 to 40% by volume with respect to the fluorothermoplastic.

8. In the preparation of a shock absorber or a gear pump comprising a bearing, the improvement which comprises using as the bearing, the sintered multi-layered plain bearing fluorothermoplastic composite material defined in claim 1.

9. A paste for the production of a plastic overlay for a plain bearing which is free of organic solvents and which is prepared by a process which comprises the following steps:
   (a) producing an aqueous dispersion free of organic solvents and which comprises:
     (1) an aqueous dispersion of a fluorothermoplastic;
     (2) 0.1 to 1.5% by weight of a non-ionic wetting agent, based on the amount of fluorothermoplastic;
     (3) 1 to 5% by weight of an ionic wetting agent based on the amount of fluorothermoplastic;
     (4) 5 to 50% by volume of a filler in relation to the volume of fluorothermoplastic; and
     (5) water;
   (b) precipitating the aqueous dispersion formed according to step (a) by adding thereto a precipitating agent and allowing a precipitated paste to settle; and
   (c) removing only excess water from the paste precipitated according to step (b) to obtain a paste which may be applied to a sintered porous metal layer without defect in any desired thickness.

10. The paste defined in claim 9 wherein the non-ionic wetting agent is selected from the group consisting of an alkyl polyglycol ether, an alkyl aryl polyglycol ether, an acyl polyglycol ether, an alkylamine oxide and a fatty acid ester of a polyalcohol.

11. The paste defined in claim 9 wherein the proportion of non-ionic wetting agent ranges between 0.1% by weight and 1.0% by weight in relation to the amount of the fluorothermoplastic.

12. The paste defined in claim 9 wherein the fluorothermoplastic is selected from the group consisting of polytetrafluoroethylene, {poly(tetrafluoroethylene-co-perfluorovinylmethyl ether)}, {poly(tetrafluoroethylene-co-hexafluoropropylene)}, {poly(ethylene-alt-tetrafluoroethylene)} and mixtures thereof.

13. The paste defined in claim 9 wherein the filler is selected from the group consisting of molybdenum sulfide, lead, lead oxide, graphite, coke, carbon black, bronze, plastic materials, fiber materials and mixtures thereof.

14. The paste defined in claim 9 wherein the filler is present in an amount of 15 to 40% by volume with respect to the fluorothermoplastic.

* * * * *